United States Patent Office 3,211,693
Patented Oct. 12, 1965

3,211,693
COATING COMPOSITIONS
Joseph E. Gaske, Argo, and Wallace H. Brown, Downers Grove, Ill., assignors to De Soto Chemical Coatings, Inc., Chicago, Ill., a corporation of Delaware
No Drawing. Filed Nov. 18, 1960, Ser. No. 70,107
15 Claims. (Cl. 260—33.6)

The present application is a continuation-in-part of our prior copending applications Serial Numbers 745,304, now abandoned and 38,762, filed June 30, 1958 and June 27, 1960, respectively.

The present invention relates to combinations of acrylic-carboxylic solution copolymers with epoxy compounds and particularly to improved solution coating compositions in which a solution copolymer including free carboxyl groups for reaction with the oxirane functionality of the epoxy compound is formulated to provide excellent adhesion to metal and other surfaces and to include relative freedom from tendencies to crater in the presence of contaminants. The invention particularly contemplates coatings possessing an extremely smooth and non-adherent surface.

It is known that copolymers of styrene and acrylic or methacrylic acid cure with epoxy compounds. Unfortunately, the presence of styrene or other vinyl aromatic compound in substantial proportion in the copolymer, e.g., in amounts in excess of about 15%, is detrimental to the achievement of various desirable film properties and the replacement of styrene by esters of an acrylic acid is of value, especially in providing improved adhesion to metal surfaces, improved flexibility and improved exterior durability, as is more fully discussed in our copending application Serial No. 38,762. However, considerable care is required in the application of many of the coating compositions described in said prior application Serial No. 38,762 because these are sensitive to contamination which leads to undesirable cratering of the coatings which are applied. It has been found, in accordance with the present invention, that solution coating compositions having dissolved therein epoxy compounds and solution copolymerized acrylic-carboxylic copolymers containing from 10–50% by weight of copolymerized residues of monoethylenically unsaturated ester component including at least one terminal hydrocarbon chain of from 6 to 20 carbon atoms resist cratering resulting from contamination.

Various contaminating agents tend to cause cratering in acrylic-carboxylic copolymers which do not include the long hydrocarbon chain-terminated esters which are used in accordance with the invention. In this regard, reference is made to dust, traces of oil or grease, inclusion of minor amounts of alkyd resin, etc. Indeed, even the rapid flowing of air over the wet coatings tends to result in the defect known as cratering which destroys the uniformity and continuity of the coating which is applied.

More particularly, the invention employs in organic solvent solution coating compositions including epoxy compound solution copolymers comprising copolymerized residues of from 10–50% by weight of monoethylenically unsaturated ester component including at least one terminal hydrocarbon chain of from 6 to 20 carbon atoms, from 20–55% of copolymerized residues of methyl methacrylate and from 4 to 23.5 equivalent percent of free carboxyl radical. Any balance of the copolymer is constituted by copolymerized copolymerizable ethylenically unsaturated monomer.

The solution copolymer preferably also includes from 10–40% by weight of copolymerized residues of ester other than methyl methacrylate of monoethylenically unsaturated acid containing terminal hydrocarbon chains of up to 4 carbon atoms.

Equivalent percent of free carboxyl radical is defined by the formula:

Equivalent percent COOH=
$$\frac{100 \text{ (mols of monomer including COOH) (number of COOH groups per molecule)}}{\text{Total mols of polymerized monomer in copolymer}}$$

The proportion of free carboxyl radical specified is important to provide sufficient carboxyl reactivity for coreaction with the oxirane groups of the epoxy compound and insufficient carboxyl reactivity to seriously impair desirable film properties.

Carboxyl reactivity is preferably provided by the inclusion in the copolymer of a monoethylenically unsaturated acid, particularly acrylic acid or methacrylic acid. Dicarboxylic acids can be employed, it being understood that each molecule of the dicarboxylic acid will provide two free carboxyl groups which is taken into consideration in the formula for equivalent percent of free carboxyl radical. Suitable dicarboxylic acids are fumaric acid, maleic acid and itaconic acid. The free carboxyl reactivity can also be supplied through the use of monoesters of dicarboxylic acids. It will be recalled that the long chain ester component and the short chain ester component may be supplied using partial esters of dicarboxylic acids. If this has been done, the free carboxyl radicals so supplied can be used to provide part of or all of the 4 to 23.5 equivalent percent of free carboxyl radical which is required in the copolymer molecule.

Referring more particularly to the monoethylenically unsaturated ester component which includes at least one terminal aliphatic hydrocarbon chain (either straight or branched) of from 6 to 20 carbon atoms, the preferred ester is 2-ethylhexyl acrylate. Esters of shorter chain length such as n-hexyl acrylate may be used but these are less preferred. Hydrocarbon chains longer than 8 carbon atoms can also be used and are effective. The invention preferably employs long chain esters of acrylic acid. Despite this preference, corresponding esters of other monoethylenically unsaturated acids may be used such as methacrylic acid. Similarly, the invention is not limited to the use of unsaturated monocarboxylic acids and mono- and diesters of fumaric acid, maleic acid and itaconic acid may be used. While esters of unsaturated acids with alkanols are preferred, it is also possible, in accordance with the invention, to employ monoethylenically unsaturated carboxylic esters such as vinyl 2-ethylhexoate, for this compound also possesses polymerizable monoethylenic unsaturation, the ester group, and the terminal aliphatic long chain hydrocarbon group.

While the invention contemplates employing from 10–50% by weight, based on the weight of the copolymer, of the long chain ester component, it is preferred to employ from 15–35% by weight of this component and more preferably about 20%.

It is necessary in the formulation of suitable coating compositions for use in commerce that the copolymer include from 20–55%, preferably from 35–45% by weight, based on the total weight of the copolymer, of copolymerized methyl methacrylate. To counter-balance the hardness introduced into the copolymer through the use of methyl methacrylate, the copolymer may desirably also include from 10–40% by weight, preferably from 20–30% by weight, of copolymerized short chain monoethylenically unsaturated carboxylic ester other than methyl methacrylate and containing terminal hydrocarbon groups of up to 4 carbon atoms. The short chain ester is preferably constituted by ethyl acrylate or butyl acrylate although methyl acrylate can, less desirably, be used. Ethyl or butyl methacrylate illustrate methacrylate esters which may be employed. Still further, mono- and diesters of dicarboxylic usaturated acids may be used such as the ethyl and butyl mono- and diesters of fumaric acid, maleic acid and itaconic acid.

As is known, monoethylenically unsaturated monomers can be polymerized in bulk or in water emulsion. The result of such bulk or emulsion copolymerization is the achievement of high molecular weight polymers which are not useful in the invention. Even if such high molecular weight products were to include free carboxyl radicals as in the invention, this carboxyl reactivity would be submerged in an excessively high molecular weight product and the reactivity required to enable extensive cure with epoxy compounds, as required in accordance with the invention, would not be present. Accordingly, the present invention requires as an essential feature the utilization of copolymers produced by solution copolymerization.

The term "solution copolymer" is intended to designate copolymers produced by solution copolymerization. In solution copolymerization, as this term is used herein, the monomer components are dissolved in an organic solvent and copolymerized while in solution. Frequently, the organic solvent is "inert," but the term "solution copolymerization" is intended to include the presence of selected solvents or other agents exhibiting chain-terminating activity, such as methyl ethyl ketone or mercaptan chain-terminating agents.

Referring more particularly to the solution copolymerization which is employed to provide the acrylic-carboxylic copolymers used in the invention, various organic solvents may be used. Thus, various organic solvents and mixtures thereof may be used including the following: aromatic hydrocarbon solvents such as benzene, toluene, xylene, ethylbenzene, isopropyl benzene and methyl naphthalene, and commercial mixtures containing the same; oxygen-containing solvents such as ethylene glycol monobutyl ether, ethylene glycol monoethyl ether, diethylene glycol monobutyl ether, diethylene glycol monomethyl ether and diethylene glycol monoethyl ether, acetone, methyl ethyl ketone, methyl isobutyl ketone, methyl n-amyl ketone, cyclohexanone, diacetone alcohol, and butyrolactone.

The copolymerization reaction takes place through the mechanism of free radicals and, to facilitate the generation of free radicals, it is preferred to employ catalysts which assist such free radical generation. The conventionally used free-radical initiators are organic peroxides, but non-peroxides are known, such as N,N-azodiisobutyronitrile.

Free-radical initiators are selected to function at certain temperature ranges, and many are available, some being:

| Low temperature (30° to 50° C.) | Intermediate temp. (about 60° C.) | High temp. (about 100° C.) |
|---|---|---|
| Acetyl benzoyl peroxide. | T-butyl hydroperoxide. | t-Butyl perphthalic acid. |
| Peracetic acid. | Methyl amyl ketone peroxide. | p-Chlorobenzoyl peroxide. |
| Hydroxybutyl peroxide. | Acetyl peroxide. | t-Butyl peracetate. |
| Isopropyl percarbonate. | Lauroyl peroxide. | Dibenzal diperoxide. |
| Cyclohexanone peroxide. | Methyl cyclohexyl hydroperoxide. | Di-t-butyl peroxide. |
| Cyclohexyl peroxide. | t-Butyl permaleic acid. | |
| 2-2-dichlorobenzoyl peroxide. | t-Butyl perbenzoate. | |
| Cumene hydroperoxide. | Di-t-butyl diperphthalate. | |
| | N,N-azodiisobutyronitrile. | |
| Methyl ethyl ketone peroxide. | Benzoyl peroxide. | |

The choice of peroxide is in part determined by its decomposition temperature as related to the temperature prevailing during the copolymerization. Benzoyl peroxide catalyzes at 60° C. and above, which temperature gives excellent results when the liquid vehicle is, for example, xylene refluxing at atmospheric pressure.

While the specific solution copolymerization procedure employed is not a principal feature of this invention, a preferred procedure using xylene, which refluxes at 137–143° C. is illustrated as follows:

*Example 1.—Solution copolymerization of acrylic monomers*

| | Parts by weight |
|---|---|
| 2-ethylhexyl acrylate | 20 |
| Methyl methacrylate | 45 |
| Ethyl acrylate | 25 |
| Methacrylic acid | 10 |
| Di-tert-butyl peroxide | 1 |
| Xylene | 54.3 |

The reaction vessel equipped with reflux condenser is completely purged of air by introducing nitrogen. The xylene is introduced and heated to reflux temperature while continuing the purging and agitating the xylene. Separately, the monomers are mixed and then the benzoyl peroxide is added to the monomer mixture for convenience in introducing the materials simultaneously at the same rate. When the xylene has reached its reflux temperature the reagents are slowly added through a control valve during a predetermined time period, arbitrarily selected for a standardized procedure, as 2¾ hours, followed for an additional refluxing time to a total of 7 hours. Then the mass is cooled and a more active solvent for the copolymer, such as isopropanol is added to insure solubility of the copolymer in the cooled solvent medium.

The yield of copolymer is substantially quantitative.

To insure complete incorporation of the somewhat sluggish 2-ethylhexyl acrylate, half of this monomer component may be added to the xylene solvent in the reaction vessel and the xylene is then heated to reflux, whereupon, the mixture of remaining monomers and catalyst is added slowly and continuously as previously described. While this modified polymerization procedure is preferred, the product is substantially identical with that produced in Example 1.

The epoxy compounds which are used in accordance with the invention may be aliphatic or aromatic and contain at least one 1,2 epoxy or oxirane group—the structure

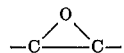

This epoxy group must be either a terminal epoxy group or form a part of an alicyclic ring, for otherwise it is not adequately reactive to function in accordance with the invention. Monoepoxides can be used in the invention, these being illustrated by propylene oxide and styrene oxide, and function to consume the carboxyl functionality of the copolymer during the cure. It is prepared, however, to employ a polyepoxide (indicated by a 1,2 epoxy equivalency in excess of 1.0, preferably in excess of 1.3) in order that the epoxy compound may function to cross-link the acrylic copolymer chains to thereby introduce a degree of thermosetting character to the cure as is most conveniently detected by improved solvent resistance. Most epoxy compounds, especially those having a molecular weight in excess of 300 are regarded as being resinous, irrespective of the presence of polymeric form, and these are preferred, particularly polyglycidyl ethers of bisphenols, such as bisphenol A[(2,2'-bis - (p-hydroxyphenylpropane)]. A bisphenol is a compound in which a pair of phenolic groups are connected together through an intervening divalent aliphatic hydrocarbon group.

It is preferred to employ the epoxy compound in approximately stoichiometric proportions based on free carboxyl radical in the copolymer. While stoichiometric proportions are preferred, the epoxy compound or resin is effective in proportions of from 0.2–1.5 equivalence of oxirane per equivalent of carboxyl in the copolymer.

Even greater amounts of epoxy compound may be used, but this is not preferred.

It is to be understood that the characteristics of the final cured films will vary with the acrylic copolymer which is selected and also with the selected epoxy compound or resin.

The preferred epoxy compounds are polyglycidyl ethers of bisphenol, as previously indicated, particularly preferred being a substantially monomeric diglycidyl ether of bisphenol A having a molecular weight of about 360 and an epoxide equivalent weight of about 200. This preferred epoxy resin is hereinafter referred to as "Epoxy Resin A." It is easily dissolved in xylene. However, other bisphenols may be used or the epoxy resin may be polymeric, as by the coreaction of the diglycidyl monomer with additional bisphenol, these higher molecular weight products including significant secondary hydroxyl functionality.

To illustrate the wide variety of aliphatic and aromatic mono- or polyepoxides which may be used to provide the epoxy compound or resin in accordance with the invention, suitable monoepoxides are illustrated by ethylene oxide, propylene oxide, styrene oxide, phenyl glycidyl ether and butyl glycidyl ether. Aliphatic polyepoxides are illustrated by butadiene dioxide, 1,4-butanediol diglycidyl ether, the polyglycidyl ether of glycerol having a 1,2 epoxy value of about 2.4 and 1,2-epoxy-2,4,4-trimethylpentane. Aromatic polyglycidyl ethers have already been illustrated, but the invention is not limited to to the preferred bisphenols since the diglycidyl ether of resorcinol may also be used. Still further, 1,2 epoxy derivatives of cycloaliphatic compounds may be used, these being illustrated by 3,4-epoxy-6-methylcyclohexylmethyl-3 - 4 - epoxy-6-methylcyclohexanecarboxylate; vinylcyclohexene dioxide and vinylcyclohexene monoxide. Additionally, glycidyl derivatives of polymeric compounds may be employed as is illustrated by the polyglycidyl ether of phenol-formaldehyde condensation products, poly(allyl glycidyl ether) and copolymers including a proportion of glycidyl acrylate or glycidyl methacrylate or allyl glycidyl ether with various acrylate or methacrylate esters or other polymerizable monoethylenically unsaturated monomers.

The preparation of organic solvent solution coating compositions in accordance with the invention is normally effected by simply adding epoxy resin or compound and preferably also a basic catalyst to the organic solvent solution of coploymer provided by solution copolymerization or by the addition of a proportion of more active solvent to the solution copolymerizate. In the preparation of pigmented coating compositions, the pigment is desirably ground into the copolymer solution and the epoxy compound and basic catalyst are added later.

Any of the organic solvents mentioned in connection with solution copolymerization may be used for solution application. Some organic solvents are more valuable to solution application than to copolymerization such as esters such as ethyl acetate, butyl acetate and butyl propionate or alcohols such as ethyl alcohol, propyl alcohol and butyl alcohol and may be used accordingly. When alcohols are used, the incorporation of epoxy resin and basic catalyst is desirably delayed because the alcohol tends to slowly degrade the oxirane functionality of the epoxy resin. Nevertheless, alcohols are excellent solvents for use in the invention.

Among the useful catalysts are tertiary amines such as dimethyl fatty amines, illustrated by diethyl octadecyl amine, quaternary amines, 2,4,6 - tri(dimethylaminomethyl)phenol, potassium hydroxide, quaternary amine hydrochlorides, dicyandiamide, morpholine, N-methyl morpholine, N-ethyl morpholine, morpholine fatty acid soaps, di-methyl p-toluidine, tri-lauryl amine, and (piperidine N - pentamethylene - dithiocarbamate). All of the foregoing except dicyandiamide rapidly promote curing at 130° F., whereas dicyandiamide does not function rapidly until higher temperaures are reached. Those functioning rapidly at lower temperatures lower the storage-life of compositions containing them and for preferred compositions are less desirable than dicyandiamide. When enamels are preferred, the catalyst is preferably incorporated with the pigment. Other catalysts are hydrazides such as stearic hydrazide.

Various auxiliary agents may be included in the coating compositions for various secondary purposes as is illustrated by lubricants such as petrolatum and polyethylene wax.

*Example 2*

A clear coating composition which is also useful as the liquid vehicle of an enamel is formed by adding to the exylene solution produced in Example 1, a solution of 21.7 parts of Epoxy Resin A, 11.0 parts of ethanol and 8.7 parts of xylene. This clear coating composition, upon addition of 0.21 parts of catalyst (dicyandiamide) may be cured at 325° F. in 20 minutes. This clear composition may also be used as the base of a white baking enamel, as in Example 3.

The copolymerizations described in Example 1 may be modified by the inclusion in the monomer charge of from 0.05–5% by weight, based on the total weight of monomers, of a mercaptan chain-terminating agent which is normally a long chain hydrocarbon mercaptan such as n-dodecyl mercaptan. The mercaptan functions to terminate the copolymer chains, limiting chain growth and, hence, molecular weight. Dodecyl mercaptan addition in an amount of 0.5–0.6% to the solution copolymerizations described is illustrative of preferred operation using mercaptan chain termination, but such termination is not vital to the invention. The mercaptan chain-terminated copolymers may be used with equal facility to form the clear enamel of Example 2 and the pigmented enamel of Example 3.

*Example 3*

A high grade commercial titanium dioxide is dispersed in the clear solution of Example 2 to a particulate fineness such that there are no particles over 10 microns in size. In this way, a white baking enamel is provided having the following composition:

| Non-Volatile content: | Percent |
|---|---|
| Pigment | 30 |
| Copolymer solids from clear solution of Example 2 | 30 |
| Dicyandiamide | .21 |
| | 60.21 |

| Volatile content: | |
|---|---|
| Eethanol | 10.84 |
| Xylene | 18.55 |
| Butanol | 4.00 |
| Methyl isobutyl carbinol | 6.25 |
| | 39.64 |

The resulting enamel composition may be thinned with a selected solvent for application. For example, for spraying, 4 volumes of the enamel may be thinned with 1 volume of exylene. In plate of xylene, a more active solvent may be selected, one such being ethylene glycol monobutyl ether, which may be used alone or mixed, as for example, 1 volume with 4 volumes of xylene.

A sprayed film of the formulation of Example 3, thinned with ¼ volume of xylene readily bakes to a dry film of 1.0 to 1.5 mil thickness.

Baking at 325° F. (163° C.) may be effected in 20 minutes, and at 350° F., (177° C.) in 15 minutes. At lower temperatures, longer time is required, for example, 30 minutes at 300° F. (149° C.).

Tints may be produced by adding a content of a suitable colored pigment together with the titanium dioxide, or by mixing into the white enamel composition a small but tinting quantity of a colored pigment dispersed in a solution containing an additional but small amount of the formula resin.

Baked films prepared as described are hard and possess an extremely smooth surface which is porcelain-like in nature. Indeed, the films are so resistant (apparently the result of the presence of the paraffin-like terminal hydrocarbon side chains contributed to the copolymer by the 2-ethylhexyl acrylate component) that they form an excellent mold release surface. This procelain-like quality prevents overcoating, thus limiting the range of coating utility. However, where exceptional surface smoothness is desired, this disadvantage may be tolerated to provide extremely smooth and glossy films which resist staining, chemical agents and which are easily cleaned since organic materials do not adhere tightly.

The invention is not limited to the specific copolymers of Example 1, as is illustrated by the following different copolymers listed in Table I which follows:

TABLE I

| Example | Parts by weight | | | | | | | |
|---|---|---|---|---|---|---|---|---|
| | 4 | 5 | 6 | 7 | 8 | 9 | 10 | 11 |
| Glacial acrylic acid | | 5 | | | | | | 3 |
| Glacial methacrylic acid | 10 | | 15 | | 20 | 10 | | |
| Itaconic acid | | | | 10 | | | | |
| Methyl methacrylate | 45 | 40 | 35 | 35 | 50 | 45 | 20 | 40 |
| Ethyl acrylate | 35 | | | 35 | 20 | 5 | | 25 |
| Methyl acrylate | | 35 | | | | | | |
| Butyl methacrylate | | | | | | | 27 | |
| Butyl acrylate | | | 25 | | | 20 | | |
| Monobutyl maleate | | | | | | | | 15 |
| 2-ethylhexyl acrylate | 10 | | | | | | 50 | 20 |
| Decyl acrylate | | 20 | | 20 | 10 | | | |
| 2-ethylhexyl methacrylate | | | | | | 20 | | |
| Hexyl acrylate | | | 25 | | | | | |

The foregoing copolymers may be solution copolymerized in 66.7 parts of refluxing xylene in the presence of 1 part of benzoyl peroxide. Each of the copolymers is useful to produce clear and pigmented enamels which resist cratering using the teachings of Examples 2 and 3.

While Examples 2, 3 and 4 employ as the epoxy compound essentially a diglycidyl ether monomer of bisphenol A corresponding results can be obtained by substituting for Epoxy Resin A any of the epoxy compounds referred to specifically herein. Preferably, in making the substitution, the epoxy compound is used in approximately stoichiometric proportions based on the carboxyl content of the copolymer. While the preferred basic curing agent for epoxy compound, in accordance with this invention, is dicyandiamide, basic curing catalysts generally are adapted to function in the curing reaction.

Basic curing catalysts are preferred in accordance with the invention, because they permit adequate cure at lower temperatures and the use of shorter baking schedules. Nevertheless, the compositions of the invention cure reasonably well at temperatures above about 360° F. in baking times of 20–40 minutes in the absence of catalyst. When adequately cured, the cured product possesses a non-adherent, smooth surface which is resistant to overcoating but with has the advantage of being easy to clean because organic matter tends not to adhere permanently to the cured surface. Accordingly, the invention provides superior coatings for single coat application and a new "release" surface.

Different ratios of epoxy compound are illustrated in Table II.

These examples can be cured with 0.21 parts of dicyandiamide. When less than the preferred stoichiometric proportion of epoxy compound is used, the resistance of cured coatings to alkali and alkaline detergence is reduced somewhat as is the impact resistance. Nevertheless, the coatings are useful and serviceable. Excess epoxy compound is not unduly harmful, but it is wasteful of materials.

*Example 20*

This example provides a further illustration of a white baking enamel in accordance with the invention.

Part A.—Resin solution: Parts by weight
Resin solids of Example 1 _____ 100
Epoxy Resin A _____ 21.7
Xylene _____ 63.0
Ethanol _____ 11.0

Part B:
Resin solution Part A _____ 6.6
Titanium dioxide _____ 28.50
2-ethyl-hexanol _____ 2.00
Butanol _____ 2.00
Monobutyl ether of ethylene glycol _____ 2.30
Xylene _____ 1.67

The above is dispersed in a pebble mill to 7½ North standard fineness. Then, is added:

Resin solution Part A _____ 50.70
Xylene _____ 3.27 and the mill drained. Then is added 2.52 parts of a 5% solution of dicyandiamide in methyl ether of ethylene glycol.

The resulting enamel composition has a viscosity of 70 seconds at 76° F. in a No. 4 Ford Cup; and a weight per gallon of 10.25 lbs.

The composition can be sprayed by dilution with one part of xylene for 4 parts of enamel composition, and the sprayed film may be cured by baking for 20 minutes at 325° F.

The coatings of the invention may be applied to steel, phosphate or chromate primed steel, aluminum, tin and plastic surfaces, etc.

The invention is defined in the claims which follow:

We claim:

1. A coating composition comprising an organic solvent solution having dissolved therein (1) a solution copolymer comprising 10–50% by weight of copolymerized monomeric monoethylenically unsaturated ester including at least one terminal aliphatic hydrocarbon chain of from 6–20 carbon atoms, from 20–55% by weight of copolymerized methyl methacrylate, and monoethylenically unsaturated acid in an amount of from 4–23.5 equivalent percent based on free carboxyl radical in accordance with the formula:

$$\text{Equivalent percent COOH} = \frac{100(\text{mols of monomer including COOH})(\text{number of COOH groups per molecule})}{\text{Total mols of polymerized monomer in copolymer}}$$

and (2) epoxy compound containing at least one 1,2-epoxy group present in an amount to supply at least 0.2 equivalent of oxirane radical per equivalent of carboxyl radical in said copolymer, said epoxy compound being selected from the group consisting of epoxy compounds having at least one terminal 1,2-epoxy group and epoxy compounds having at least one alicyclic ring containing at least one 1,2-epoxy group.

TABLE II

| Example | 12 | 13 | 14 | 15 | 16 | 17 | 18 | 19 |
|---|---|---|---|---|---|---|---|---|
| Solids of copolymer of Example 1 | 95 | 90 | 80 | 75 | 82.2 | 100 | 100 | 100 |
| Epoxy Resin A | 5 | 10 | 20 | 25 | 17.8 | 22 | 17.8 | 33.4 |
| Range of percent excess of epoxy resin | | | 2.56 to 13.3 | 36.6 to 51.1 | | | | 36.9 to 51.1 |
| Range of percent deficiency of epoxy resin | 76.2 to 78.5 | 54.2 to 49.7 | | | 2.2 to 11.5 | 0 to 9.84 | 20.4 to 27.9 | |

2. A coating composition as recited in claim 1 in which said solution includes a basic curing catalyst for said epoxy compound.

3. A coating composition as recited in claim 1 in which the free carboxyl content of said copolymer is supplied by copolymerized acid selected from the group consisting of acrylic acid and methacrylic acid and said copolymer includes from 10–40% by weight of copolymerized ester of monoethylenically unsaturated carboxylic acid other than methyl methacrylate and containing terminal hydrocarbon chains of up to 4 carbon atoms.

4. A coating composition as recited in claim 1 in which the terminal aliphatic hydrocarbon chains of from 6–20 carbon atoms is supplied by copolymerized 2-ethylhexyl acrylate.

5. A coating composition comprising an organic solvent solution having dissolved therein (1) a solution copolymer comprising 15–35% by weight of copolymerized monomeric monoethylenically unsaturated ester including at least one terminal aliphatic hydrocarbon chain of from 6–20 carbon atoms, from 35–45% by weight of copolymerized methyl methacrylate, from 20–30% by weight of copolymerized ester of monoethylenically unsaturated carboxylic acid other than methyl methacrylate and containing terminal hydrocarbon chains of up to 4 carbon atoms, and monoethylenically unsaturated acid in an amount of from 4–23.5 equivalent percent based on free carboxyl radical in accordance with the formula:

Equivalent percent COOH =
$$\frac{100(\text{mols of monomer including COOH}) (\text{number of COOH groups per molecule})}{\text{Total mols of polymerized monomer in copolymer}}$$

(2) epoxy compound containing at least one 1,2-epoxy group present in an amount to supply at least 0.2 equivalent of oxirane radical per equivalent of carboxyl radical in said copolymer, said epoxy compound being selected from the group consisting of epoxy compounds having at least one terminal 1,2-epoxy group and epoxy compounds having at least one alicyclic ring containing at least one 1,2-epoxy group, and (3) a basic curing catalyst for said epoxy compound.

6. A coating composition as recited in claim 5 in which said ester having a terminal hydrocarbon chain of up to 4 carbon atoms is ethyl acrylate.

7. A coating composition as recited in claim 6 in which the free carboxyl content of said copolymer is supplied by copolymerized acid selected from the group consisting of acrylic acid and methacrylic acid, and in which the terminal aliphatic hydrocarbon chains of from 6–20 carbon atoms is supplied by copolymerized 2-ethylhexyl acrylate.

8. A coating composition as recited in claim 5 in which said epoxy compound is a polyglycidyl ether of a bisphenol having a 1,2-epoxy equivalency in excess of 1.3.

9. A coating composition as recited in claim 5 in which said coating composition includes dispersed pigment.

10. A coating composition as recited in claim 9 in which said dispersed pigment comprises titanium dioxide.

11. A coating composition as recited in claim 5 in which said organic solvent comprises a major proportion of xylene.

12. An article having adhered thereto a baked coating comprising the reaction product of (1) a solution copolymer comprising 10–50% by weight of copolymerized monomeric monoethylenically unsaturated ester including at least one terminal aliphatic hydrocarbon chain of from 6–20 carbon atoms, from 20–55% by weight of copolymerized methyl methacrylate, and monoethylenically unsaturated acid in an amount of from 4–23.5 equivalent percent based on free carboxyl radical in accordance with the formula:

Equivalent percent COOH =
$$\frac{100(\text{mols of monomer including COOH}) (\text{number of COOH groups per molecule})}{\text{Total mols of polymerized monomer in copolymer}}$$

and (2) epoxy compound containing at least one 1,2-epoxy group present in an amount to supply at least 0.2 equivalent of oxirane radical per equivalent of carboxyl radical in said copolymer, said epoxy compound being selected from the group consisting of epoxy compounds having at least one terminal 1,2-epoxy group and epoxy compounds having at least one alicyclic ring containing at least one 1,2-epoxy group.

13. A coated article as recited in claim 12 in which the free carboxyl content of said copolymer is supplied by copolymerized acid selected from the group consisting of acrylic acid and methacrylic acid and said copolymer includes from 10–40% by weight of copolymerized ester of monoethylenically unsaturated carboxylic acid other than methyl methacrylate and containing terminal hydrocarbon chains of up to 4 carbon atoms.

14. A coated article as recited in claim 12 in which said coating is pigmented.

15. An article having adhered thereto a baked coating comprising the reaction product of (1) a solution copolymer comprising 15–35% by weight of copolymerized monomeric monoethylenically unsaturated ester including at least one terminal aliphatic hydrocarbon chain of from 6–20 carbon atoms, from 35–45% by weight of copolymerized methyl methacrylate, from 20–30% by weight of copolymerized ester of monoethylenically unsaturated carboxylic acid other than methyl methacrylate and containing terminal hydrocarbon chains of up to 4 carbon atoms, and monoethylenically unsaturated acid in an amount of from 4–23.5 equivalent percent based on free carboxyl radical in accordance with the formula:

Equivalent percent COOH =
$$\frac{100(\text{mols of monomer including COOH}) (\text{number of COOH groups per molecule})}{\text{Total mols of polymerized monomer in copolymer}}$$

and (2) epoxy compound containing at least one 1,2-epoxy group present in an amount to supply at least 0.2 equivalent of oxirane radical per equivalent of carboxyl radical in said copolymer, said epoxy compound being selected from the group consisting of epoxy compounds having at least one terminal 1,2-epoxy group and epoxy compounds having at least one alicyclic ring containing at least one 1,2-epoxy group, said baked coating having a smooth surface resistant to overcoating.

References Cited by the Examiner

UNITED STATES PATENTS

| | | |
|---|---|---|
| 2,798,861 | 7/57 | Segall et al. |
| 2,832,747 | 4/58 | Jackson. |
| 2,872,427 | 2/59 | Schroeder _____ 260—29.6 |
| 2,949,438 | 8/60 | Hicks. |
| 2,954,358 | 9/60 | Hurwitz. |
| 2,964,492 | 12/60 | Murdock et al. |

FOREIGN PATENTS

| | | |
|---|---|---|
| 145,724 | 3/52 | Australia. |

MORRIS LIEBMAN, *Primary Examiner.*

DANIEL ARNOLD, *Examiner.*